Sept. 14, 1943.                J. R. ALBERS                 2,329,675
            AUXILIARY WIND ELECTRIC SYSTEM FOR PRIME MOVERS
                          Filed Dec. 22, 1941

INVENTOR
                                         John R. Albers
                         BY
                                              ATTORNEY Patented Sept. 14, 1943

2,329,675

UNITED STATES PATENT OFFICE 2,329,675

AUXILIARY WIND ELECTRIC SYSTEM FOR PRIME MOVERS

John R. Albers, Sioux City, Iowa, assignor to Wincharger Corporation, Sioux City, Iowa, a corporation of Minnesota Application December 22, 1941, Serial No. 424,031

5 Claims. (Cl. 290—4)

My invention pertains to wind electric systems.

An object of my invention is to provide an electric plant, wherein wind is utilized to supply power to be used to assist the prime mover and in so doing to lower operating costs.

A further object of my invention is to provide means for transferring electric power generated by the wind generator to a constant speed and at the same time leaving the wind driven propeller prime mover free to vary in speed corresponding to the varying wind velocities which result in obtaining maximum propeller efficiency.

A further object of my invention is to provide a flexible arrangement wherein, if desired, a plurality of tower mounted, wind-driven generators can be employed and operated in a multiple to provide simplified manufacturing features.

A further object of my invention is to provide in that particular arrangement wherein alternators are employed, means for assisting such alternators without impairing the constant speed regulating system of the prime mover driven alternator.

Figure 1:
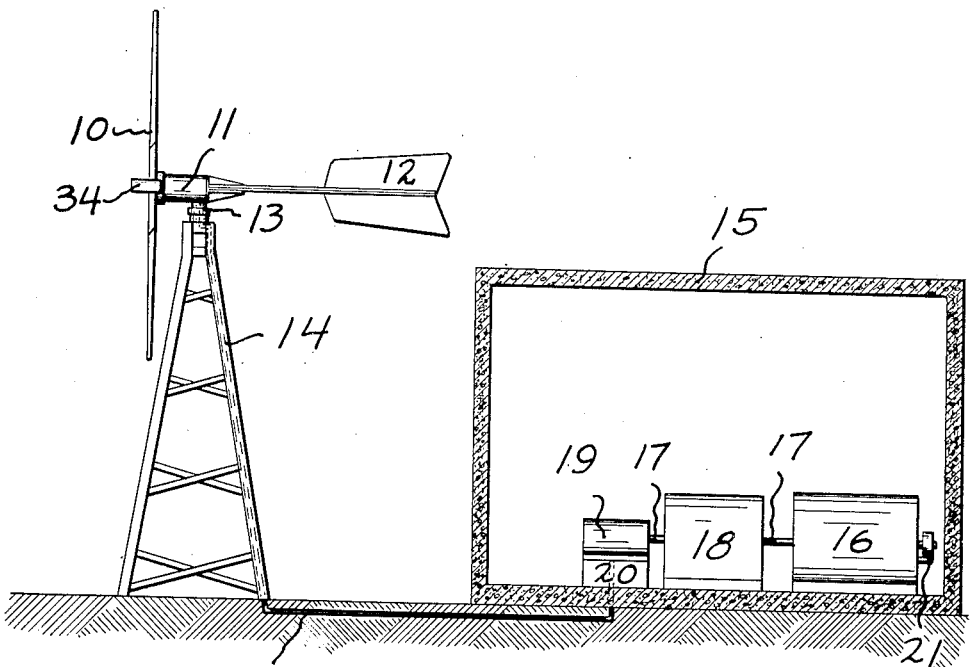
Figure 2:
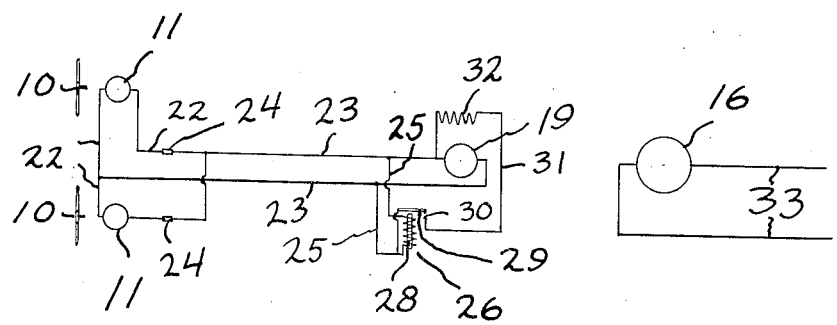

With these and other objects in view, my invention consists in the construction, arrangement, and combination of the various parts of my device, whereby the objects contemplated are attained, as hereinafter more fully set forth, pointed out in my claims, and illustrated in the accompanying drawing, in which:

Figure 1 is a side-elevation showing a single tower mounted unit with the prime mover members situated nearby in a power station, and Figure 2 is a diagram of the electrical connections.

I have used the character 10 to designate an impeller blade structure, having a pair of blades positioned radially and attached to a shaft which rotates the armature of an electric generator 11, driven at variable speed by the impeller 10, which generator is attached to a tail vane 12, and which generator is pivotally mounted at 13 to the top of the tower 14.

Positioned either closely to, or in some instances remotely from the tower 14 is a generating station indicated generally by the character 15, in which is mounted the prime mover units comprising the alternating current, or in some cases direct current generator 16 which is driven by a shaft 17 which is coupled directly to a steam turbine 18. The shaft 17 continues through the prime mover 18, which may, for example, be a turbine, and is attached to the armature of a further auxiliary motor 19 which is mounted on a suitable platform 20. In those instances wherein alternating current is used, it is essential to maintain the frequency of the current at a fixed rate, and in this instance a governor 21 is attached to the extremity of the shaft 17 which governor controls the input of steam into the turbine 18 directly, according to the speed of the generator 16 so that such frequency is consistently maintained.

I also contemplate that type of arrangement, wherein the turbine 18 is replaced by a Diesel engine wherein the fuel supply is controlled by the governor 21 to maintain the frequency of the current at a fixed rate. Further elements in the combination are disclosed in Figure 2 or in the electrical and wiring diagram, and wherein the character 22 indicates the leads from the wind driven generators 11 which leads 22 pass through the conduit 22a, and communicate with the main leads 23 which are connected to the auxiliary motor 19. It will be understood that one unit generator 11 can be employed or more as shown in Figure 2, a plurality of units being desirable in those cases wherein manufacturing considerations allow for the building of such units at a lower cost in large quantities. Relays 24 are inserted in the circuit to prevent surges from one unit to the other. Attached to the leads 23 are further leads 25 which are attached to a relay 26 having the coil 27, the core 28, and the contacting armature 29 which establishes contact at 30 to the lead 31 which is attached to the field coils 32 of the motor 19. The relay 26 is adapted to maintain contact at a certain predetermined voltage and to open the field circuit 32 when the voltage correspondingly drops in the leads 23. As shown in Figure 2 the generator 16 and its circuits are electrically independent of the balance of the arrangement, the outgoing power circuit being indicated by the character 33. The power output of the motor 19 is normally the same as, or less than, the minimum output requirement of the generator 16 at any stage of its operation. The arrangement functions in the following manner.

It will be noted from Figure 2, that the wind electric units 11 supply the motor 19 during the required wind conditions established by the relay 26 up to the maximum power output capacity of the motor 19. As a result, the motor 19 will constantly under such conditions exert torque or driving power to the shaft 17 thereby aiding the turbine 18, or Diesel engine, which effect is manifested by reduction in operating costs. When an alternator is used at 16 the governor 21, however, will maintain a fixed speed regardless of the amount of help from the wind driven motor, since the maximum output of the wind motor always is less than the minimum load on the prime mover unit. In those instances when the wind velocity is insufficient to maintain required minimum voltage the relay 26 will open, thereby opening the field 32 and de-energizing the motor 19 so that the armature of the motor will be carried by the turbine 18 and will run freely without load, and also providing the important feature of preventing a reverse current flowing from the motor back to the units 11. A standard air brake governor, indicated by the character 34, governs the speed of rotation of the wind unit and therefore the output therefrom in order to protect the generator 11 and propeller 10 against damage in excessive winds. An overrunning clutch can be used between the motor and alternator taking place of above mentioned relays if so desired. The effect would be the same since it too would prevent reversal of current, and prevent any unnecessary drag on the generator.

As a result of the foregoing arrangement, it will be seen that the primary objectives to provide an auxiliary arrangement for the necessary purposes is attained, without the necessity of using mechanical or other cumbersome arrangements and yet providing all of the desirable features.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A wind electric system comprising a wind driven generating source, a prime mover, a further generator connected to said prime mover, an auxiliary electric motor for drivingly assisting said prime mover and said further generator, means responsive to generation of electricity by said wind driven source for connecting said wind driven source and said auxiliary motor to cause power flow to said further generator from said wind driven generator through said motor, whereby the actuation thereof provides an added torque to be transmitted from said auxiliary motor to said prime mover and said further generator.

2. A wind electric system comprising a wind driven generating source, a prime mover, a further generator connected to said prime mover, an auxiliary electric motor for drivingly assisting said prime mover and said further generator, means connecting said wind driven source and said auxiliary motor to energize said motor whereby the actuation thereof will provide an added torque to be transmitted from said auxiliary motor to said prime mover and said further generator, means for automatically disconnecting said auxiliary motor at a pre-determined low power input thereto.

3. A wind electric system comprising a wind driven generating source, a prime mover, a further generator connected to said prime mover, an auxiliary electric motor for drivingly assisting said prime mover and said further generator means connecting said wind driven source and said auxiliary motor to energize said motor whereby the actuation thereof will provide an added torque to be transmitted from said auxiliary motor to said prime mover and said further generator, means for de-energizing said auxiliary motor at a pre-determined low voltage point, said last means including a relay positioned in the field circuit of said auxiliary motor and operated from said wind driven electric source.

4. A wind electric system comprising a variable speed wind driven generating source, a prime mover, a further generator connected to said prime mover and arranged to operate at constant speed, an auxiliary electric motor for driving said prime mover and said further generator at such constant speed, means connecting said wind driven source and said auxiliary motor to energize said motor upon the generation of power by said variable speed wind driven generating source whereby the actuation thereof will provide an added torque to be transmitted from said auxiliary motor to said prime mover and said further generator, and the variable speed generation of power by said wind driven source does not affect the operation of said further generator at a fixed constant speed.

5. An electric generating system comprising a generator driven at variable speed and capable of a correspondingly variable power output, a prime mover, a second generator driven from said prime mover, an electric motor connected to said second generator and prime mover and arranged to assist said prime mover in driving said second generator, said prime mover being arranged to drive said second generator at constant speed over a substantial range of variable power transfer between a maximum and a minimum power transfer condition between said prime mover and said second generator and means for transferring power to said motor from said variable speed generator during generation of power thereby, said variable speed generator and said motor having similar power handling capabilities smaller than the difference between said maximum and minimum power transfer between said prime mover and said second generator whereby, during conditions of variable power generation by said variable speed generator said prime mover is capable of maintaining and maintains said second generator at constant speed.

JOHN R. ALBERS.